US009956136B1

(12) United States Patent
Moore

(10) Patent No.: US 9,956,136 B1
(45) Date of Patent: May 1, 2018

(54) QUICK AND EASY BENCH AND THE HOT TUB COVER PLATFORM

(71) Applicant: John Moore, Calhan, CO (US)

(72) Inventor: John Moore, Calhan, CO (US)

( * ) Notice: Subject to any disclaimer, the term of this patent is extended or adjusted under 35 U.S.C. 154(b) by 0 days. days.

(21) Appl. No.: 15/241,235

(22) Filed: Aug. 19, 2016

Related U.S. Application Data

(60) Provisional application No. 62/283,055, filed on Aug. 19, 2015.

(51) Int. Cl.
*A47G 29/02* (2006.01)
*A61H 33/00* (2006.01)
*A47C 11/00* (2006.01)
*A47C 4/00* (2006.01)
*F16M 13/02* (2006.01)
*E04H 4/06* (2006.01)

(52) U.S. Cl.
CPC ............... *A61H 33/60* (2013.01); *A47C 4/00* (2013.01); *A47C 11/00* (2013.01); *F16M 13/02* (2013.01); *E04H 4/06* (2013.01)

(58) Field of Classification Search
CPC ........... A61H 33/60; A47C 4/00; A47C 11/00; F16M 13/02; E04H 4/06
USPC ....... 248/213.2, 398, 240, 240.2; 4/498, 500
See application file for complete search history.

(56) References Cited

U.S. PATENT DOCUMENTS 4,991,238 A * 2/1991 Forrest .................... E04H 4/084 4/498
5,421,131 A * 6/1995 Heckman ............... A47C 11/00 256/67
5,471,685 A * 12/1995 Cross ...................... E04H 4/086 220/263
5,644,803 A * 7/1997 Wilson .................... E04H 4/088 220/811
6,039,416 A * 3/2000 Lambert .................. A47B 5/06 108/48
D495,506 S * 9/2004 Self ................................ D6/362
7,290,297 B2 * 11/2007 Cunerty ................. A47K 3/001 248/286.1
7,604,027 B2 * 10/2009 Thatcher .................. B25H 1/04 108/116
8,157,053 B1 * 4/2012 Lameiro ................. E06C 1/005 182/222
8,408,404 B2 * 4/2013 Miller ...................... A47B 5/00 211/90.01
9,216,507 B2 * 12/2015 Kirchgessner ........... B25H 1/02
2011/0259530 A1 * 10/2011 Brook ..................... E04H 4/082 160/120

* cited by examiner

*Primary Examiner* — Gwendolyn W Baxter
(74) *Attorney, Agent, or Firm* — Wilmer Cutler Pickering Hale and Dorr LLP

(57) ABSTRACT

A quick and easy bench and a hot tub cover platform. The bench top has three support braces: one left side, one center, and one right side. The bench top is hinged to a 2×4 on a wall. There is another 2×4 lower on the wall for the left, center, and right side braces to support the bench top. There are saddles on the bottom of the bench and a lower 2×4 on wall for the braces to support the bench. The top of the hot tub platform consists of 5-2×4's screwed to 4 stringers running perpendicular to the 5-2×4's and supported on the backside by 4 vertical 2×4's with a cross brace 2×4 at the bottom and top. The platform is attached to the hot tub skirt by a 2×4 screwed on the tub skirt.

18 Claims, 4 Drawing Sheets

QUICK AND EASY BENCH AND THE HOT TUB COVER PLATFORM

CROSS-REFERENCE TO RELATED APPLICATIONS

The present application claims priority from U.S. Provisional Patent Application No. 62/283,055, filed Aug. 19, 2015.

FIELD OF THE INVENTION

The present invention relates to a quick and easy bench and a hot tub cover platform.

SUMMARY OF THE INVENTION

The present invention relates to a quick and easy bench and a hot tub cover platform.

The bench top has three support braces: one left side, one center, and one right side. The bench top is hinged to a 2×4 on a wall. There is another 2×4 lower on the wall for the left, center, and right side braces to support the bench top. There are saddles on the bottom of the bench and a lower 2×4 on wall for the braces to support the bench.

The top of the platform consists of 5-2×4's screwed to 4 stringers running perpendicular to the 5-2×4's and supported on the backside by 4 vertical 2×4's with a cross brace 2×4 at the bottom and top. The platform is attached to the hot tub skirt by a 2×4 screwed on the tub skirt.

DETAILED DESCRIPTION OF THE INVENTION

Quick and Easy Bench: A collapsible bench top hinged on the wall by 3 hinges to a 2×4 screwed into the wall studs, 3 hand set braces to support the bench top when in the up position, and a lower 2×4 screwed into the wall studs. There are U-shaped saddles on the bottom side of the bench top and the lower wall stud. The 3 hand set braces set in the saddles on the underside of the bench top and the lower wall stud to secure the bench in the up position. Braces run at a 45-degree angle.

The top and bottom is 2×4's to support the bench that is screwed into the existing wall studs. There are 3 hinges that the bench top folds up and down that are located directly behind the saddles for braces attached to the bench top and top 2×4 at wall. The hinges are the only moving parts.

To put the bench in the upright position, lift the bench top up until the top comes into contact with the edge of the 2×4 supporting the bench hand set in the center brace to support bench into the saddle on the lower 2×4 and the saddle underneath the bench. Then place the left and right braces the same way. The bench is ready for use. Top and bottom of braces can be drilled and screwed for more stability.

To lower the bench, just lift the bench top up slightly until all 3 braces come out of the saddles. They store in the gap between the bench top and the top 2×4 on the wall.

Bench can be set at any height desired where it is installed to suit the user's height.

Example shown is 24" wide and 96" long, however the bench top can be made to any width and length.

Figure 1A:
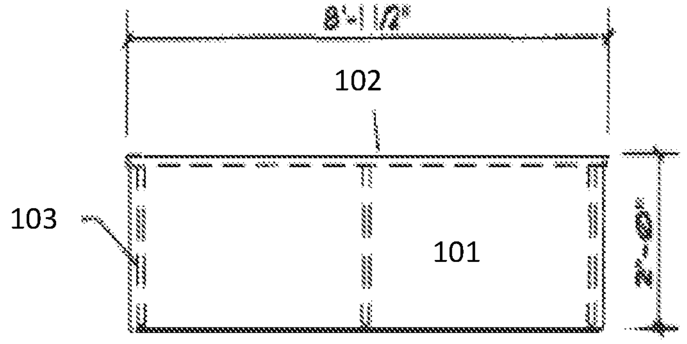
FIG. 1A-1H. Views of bench. Top view of bench (1A). Front view, bench up (1B). Side view, bench up (1C). Side view, bench down (1D). Brace detail, front view (1E). Brace detail, side view (1F). Saddle, side view (1G). Saddle, front view (1H).
Figure 1B:
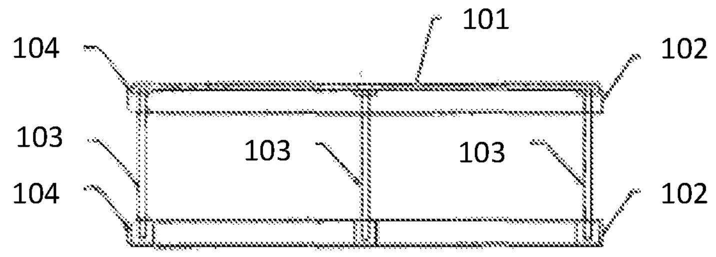
Figure 1C:
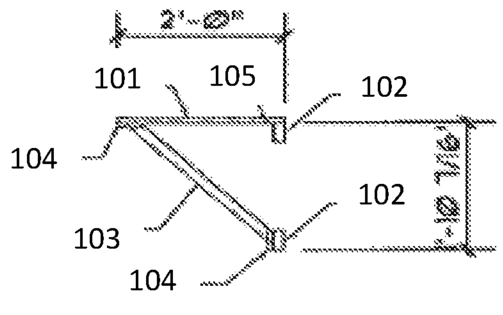
Figure 1D:
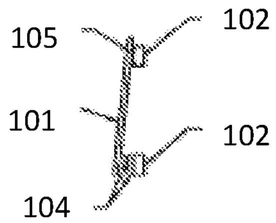
Figure 1E:
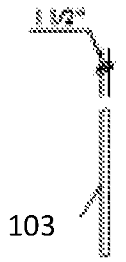
Figure 1F:
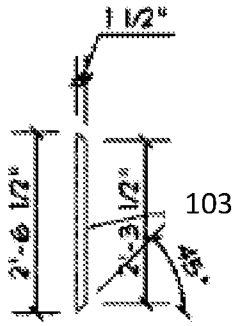
Figure 1G:
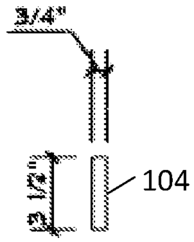
Figure 1H:
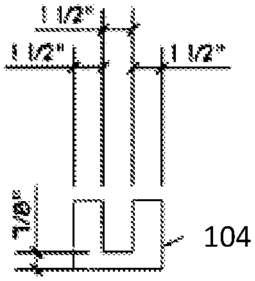

Views of bench are shown in FIG. 1A-1F. Top view of bench (FIG. 1A) shows a 97½" long 2"×4" support (102) attached to wall to mount hinged bench top on, ¾" plywood bench top (101), and angled braces (103). Each brace is attached to the mount with a hinge underneath the bottom of the bench. Front view, bench up (FIG. 1B) shows the bench top (101). Three hinges on the underside of the bench top (101) are located directly behind saddles for the braces (103) attached to the bench top, and top 2"×4" support on wall (102) so the top can fold down to the wall. Another 2"×4" support (102) is mounted on the wall below the bench for the saddles (104) to mount on. Side view, bench up (FIG. 1C) shows the bench top (101) attached to the top support (102) with a hinge (105), and supported by a bench brace (103) resting on a saddle (104). Side view, bench down (FIG. 1D) shows a top and bottom 2"×4" supports (102) attached to wall, the top support attached to hinges (105) and the bottom support attached to saddles (104) for the brace to slide into, and the bench top (101) in the down position. Brace detail, front view (FIG. 1E) shows a 1½" wide brace (103). Brace detail, side view (FIG. 1F) shows a 30½" long and 1⅝" wide brace (103) cut at a 45° angle on each end. Saddle, side view (FIG. 1G) shows a ¾" thick saddle (104) for the braces to slide into. Saddle, front view (FIG. 1H) shows a 4½" wide, 3½" high saddle (104) with a 1½" slot for the braces to slide into.

Top can be sealed if used with liquids.

Easy to operate, self-storing braces, only requires a 3¾" of space on the wall when in the collapsed position.

Hot tub cover platform: The hot tub cover platform is attached to the hot tub skirt by a 2×4 attached to the tub skirt. The platform's horizontal surface that the tub cover rests on has 4 vertical 2×4's to support the backside of the platform. There is a horizontal brace at the bottoms and tops of the vertical 2×4's. The platform has no moving parts; it stays in a fixed position. The cover of the hot tub is lifted up to rest on the top of the platform, and leans against the horizontal brace at the top of the 4 vertical 2×4's. It is operated by the person using the tub.

The cover platform is made of all 2×4's. The platform is screwed together as shown on the diagram, 4 stringers to support 5-2×4's. The cover sets on 4-2×4's (vertical) and 2-2×4's (horizontal) for braces that make up the vertical support for the cover to lean against. When the entire platform is assembled it is then screwed to a ledger board 2×4 screwed into the hot tub skirt.

The platform can be made to any width or height to fit on any size hot tub so it functions and looks correct.

Example shown is an 84" tub with a 38" height.

Figure 2A:
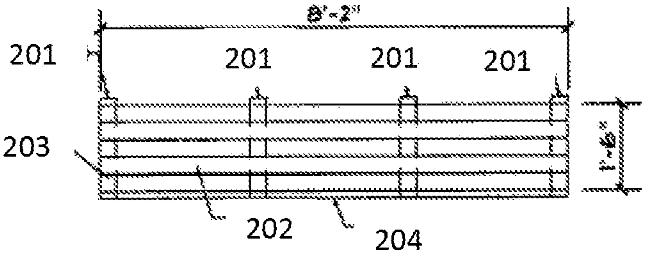
FIG. 2A-2C. Hot tub cover platform. Top view (2A). Front view (2B). End view (2C).
Figure 2B:
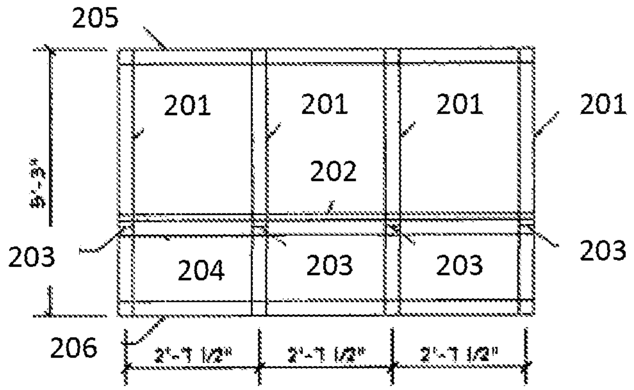
Figure 2C:
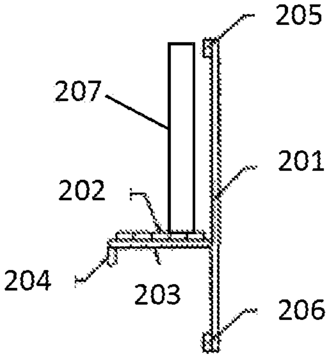

FIG. 2A-2C shows top (FIG. 2A), front (FIG. 2B) and side (FIG. 2C) views. FIG. 2A shows vertical stringers (201), and 5-2"×4" boards (202) with a ⅛" gap between each board. Each of the 2"×4" boards (202) are 82" long, and are held together with horizontal stringers (203) underneath that are connected to the vertical stringers (201). FIG. 2B shows a front view with four vertical stringers (201), horizontal stringers (203), a ledger board that can be screwed on the hot tub skirt (204), a top brace (205), a bottom brace (206), and the top of the platform made of 5-2"×4" boards (202). FIG. 2C shows a side view with the top (205) and bottom (206)

horizontal braces mounted to 63" long vertical stringers (201). Horizontal stringers (203) extend from the vertical stringers (201) to a ledger board (204) that is screwed on the hot tub skirt. The 2"×4" boards (202) are mounted on the horizontal stringers (203), and the hot tub cover (207) rests on the boards (202). The platform can be made wider and taller for larger hot tubs.

The top brace can be personalized with whatever desired. (See FIG. 2A-C).

Easy to install, there are no moving parts, nothing to wear out, creates privacy when it is up in the stand.

Can be stained to match hot tub skirts.

What is claimed is:

1. A collapsible bench comprising, a. a first support having a first end and a second end, wherein the first support is attached to a wall at a plurality of positions between the first end and second end;

b. a bench top having a first end, a second end, a proximal side, and a distal side, wherein the distal side is hinged to the first support;

c. a second support having a first end and a second end, wherein the second support is attached to the wall at a plurality of positions between the first end and second end, and wherein the second support is attached to the wall at a position below the first support;

d. three upper saddles attached to an underside of the bench top, wherein the upper saddles are positioned toward the proximal side of the bench top;

e. three lower saddles attached to the second support; and f. three hand set braces, each having a first end and a second end;

wherein the first end of each hand set brace is configured to set in an upper saddle, and the second end of each hand set brace is configured to set in a lower saddle when the bench is in an up position; and wherein the bench is configured such that when the braces are removed the bench top collapses to a down position wherein the distal side of the bench top remains hinged to the first support on the wall.

2. The bench of claim 1, wherein the first and second support are attached to wall studs with screws.

3. The bench of claim 1, wherein the distal side is hinged to the first support with three hinges.

4. The bench of claim 3, wherein each hinge is attached to an underside of the bench top along the distal side of the bench top.

5. The bench of claim 1, wherein each brace is screwed into a lower saddle.

6. The bench of claim 1, wherein the first and second support are each a 2×4 board.

7. The bench of claim 1, wherein the hand set braces are configured to be stored in the gap between the bench top and the top support when the bench is collapsed.

8. The bench of claim 1, wherein upper saddles are hinged to an underside of the bench top.

9. The bench of claim 1, wherein the bench top is made of plywood.

10. The bench of claim 1, wherein each hand set brace is 1×½ inches wide.

11. A hot tub cover platform comprising, a. a top brace having a first end and a second end;

b. a bottom brace having a first end and a second end;

c. four vertical stringers each having a first end and a second end, wherein the first end of each vertical stringer is attached to the top brace at a position between the first and second end of the top brace, and wherein the second end of each vertical stringer is attached to the bottom brace at a position between the first and second end of the bottom brace;

d. a ledger board having a first end and a second end, wherein the ledger board is configured to attach to a hot tub skirt at a plurality of attachment points between the first end and the second end;

e. two horizontal stringers each having a first end and a second end, wherein the first end of each horizontal stringer is attached to a position between the first and second ends of a vertical stringer, and wherein the second end of each horizontal stringer is attached to a position between the first and second ends of the ledger board, such that each horizontal stringer extends from a vertical stringer to the ledger board; and f. a platform top comprising a plurality of top boards, each board having a first end and a second end, wherein each top board is mounted to a top side of each horizontal stringer at a position between the first end and second end of the top board, and wherein the top boards run perpendicular to the horizontal stringers;

wherein the cover platform is configured such that the hot tub cover rests on the platform top when the hot tub cover is removed from the top of the hot tub.

12. The platform of claim 11, wherein the top brace and the bottom brace are each a 2×4 board.

13. The platform of claim 11, wherein each vertical stringer is screwed to the top brace.

14. The platform of claim 12, wherein the ledger board is a 2×4 board.

15. The platform of claim 11, wherein each horizontal stringer is a 2×4 board.

16. The platform of claim 12, wherein each vertical stringer is a 2×4 board.

17. The platform of claim 11, wherein the platform top comprises five top boards.

18. The platform of claim 17, wherein each top board is a 2×4 board.

* * * * *